No. 839,392. PATENTED DEC. 25, 1906.
J. P. KELLY.
WATER METER.
APPLICATION FILED DEC. 26, 1905.
3 SHEETS—SHEET 1.
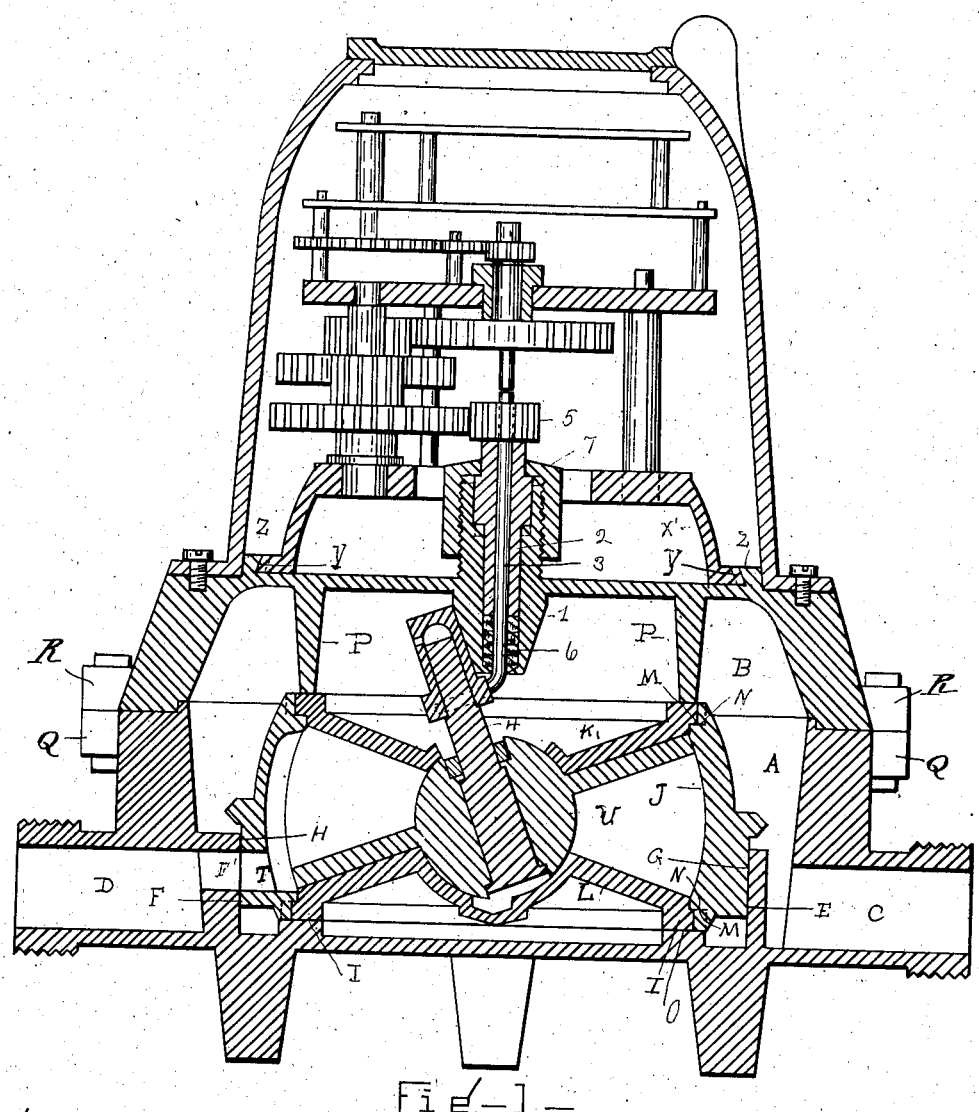
Fig-1-
WITNESSES—
Lucy Verrill
Marion Richards.
INVENTOR—
John P. Kelly
by Clifford Verrill Clifford
Attorneys No. 839,392. PATENTED DEC. 25, 1906.
J. P. KELLY.
WATER METER.
APPLICATION FILED DEC. 26, 1905.
3 SHEETS—SHEET 2.
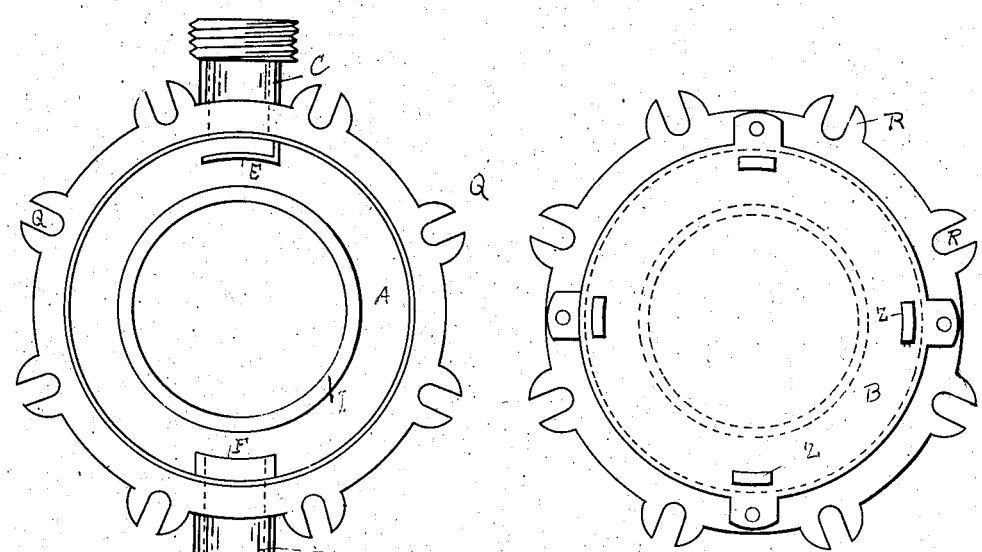
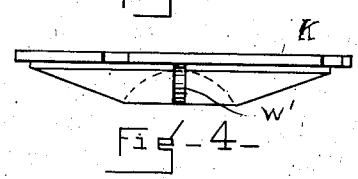
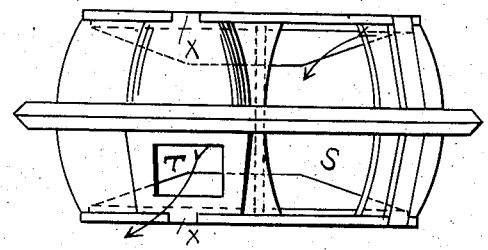
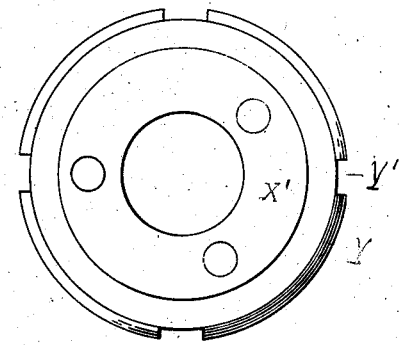
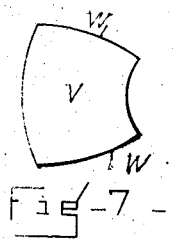
WITNESSES—
Lucy Verrill
Marion Richards
INVENTOR—
John P. Kelly
by Clifford Verrill Clifford
Attorneys

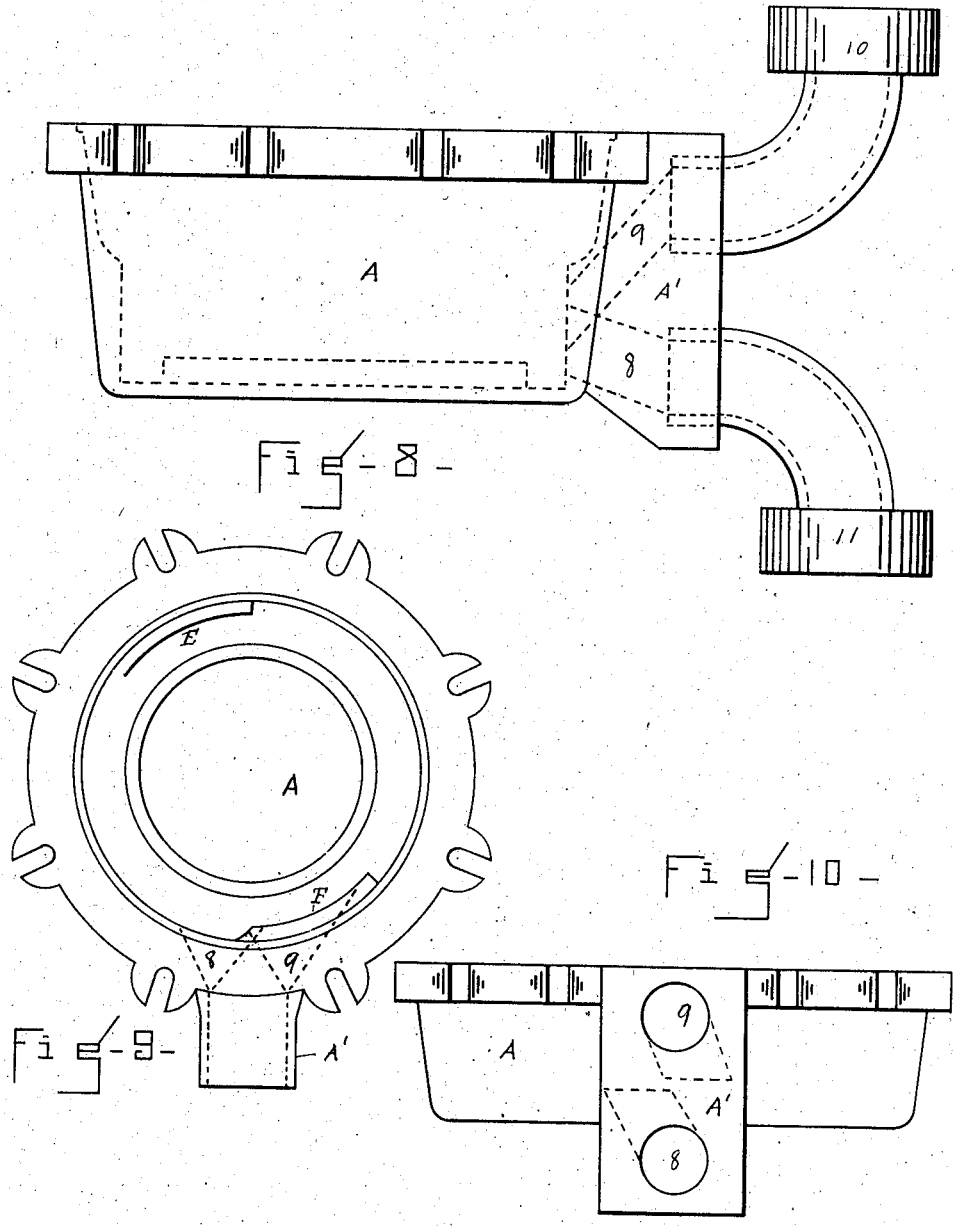

UNITED STATES PATENT OFFICE.

JOHN P. KELLY, OF WORCESTER, MASSACHUSETTS.

WATER-METER.

No. 839,392.  Specification of Letters Patent.  Patented Dec. 25, 1906.

Application filed December 26, 1905. Serial No. 293,230.

*To all whom it may concern:*

Be it known that I, JOHN P. KELLY, a citizen of the United States, and a resident of Worcester, in the county of Worcester, Commonwealth of Massachusetts, have invented new and useful Improvements in Water-Meters, of which the following is a specification.

My invention relates to improvements in water-meters. Its object is to provide a water-meter in which the operating-gears and their connections are housed outside of the water-containing portion of the meter and effectually protected from contact with the water. Its object is, further, to provide a disk-chamber which can be perfectly drained.

It also relates to improved means for mounting the disk-chamber in the inclosing case, obviating the necessity for screw or bolt adjustments.

It also relates to means for adapting my improved meter for use in connection with upright as well as horizontal service-pipes.

In the drawings herewith accompanying and making a part of this application, Figure 1 is a vertical central sectional view of my improved water-meter. Fig. 2 is a top plan view of the base or lower portion of the disk-chamber-inclosing case. Fig. 3 is a plan view of the top portion of the disk-chamber-inclosing case. Fig. 4 is a side elevation of the removable top of the disk-chamber, it being understood that the removable bottom of the disk-chamber is the counterpart of the top shown in Fig. 4. Fig. 5 is a side elevation of the disk-chamber, showing the inlet and outlet ports. Fig. 6 is a top plan of the gear-stand upon which the registering-gear is mounted. Fig. 7 is a side view of the diaphragm in the disk-chamber, which is vertically positioned between the inlet and outlet ports. Fig. 8 is a side elevation of the base or lower portion of the casing when adapted for use in connection with vertical service-pipes. Fig. 9 is a plan view looking into the same, and Fig. 10 is a front end elevation with the union being removed.

The same characters of reference refer to like parts.

In said drawings, A represents the base, and B the top, of the disk-chamber-inclosing case. The base is provided with an inlet-port C and an outlet-port D, each having the usual threads for connection with the piping. Formed integral with the inside of the base are disk-chamber-positioning walls E and F, respectively, the face of said walls being in the arc of a circle in horizontal section and machined. The disk-chamber has corresponding circular faces G and H, respectively, and of a radius also machined to register with a close fit with the parts E and F aforesaid, whereby the disk-chamber when in position is held centrally positioned. Centrally positioned in the bottom of the base is a raised ring I. The disk-chamber has a vertical body J, a removable top K, and a removable bottom L, said top and bottom being provided with flanges M, resting on the edges N of the chamber. The bottom head of the disk-chamber has a bearing-surface O, which rests on the ring I in the bottom of the base, and the contacting faces being carefully machined make a water-tight joint. Resting between the positioning-walls E and F and upon the ring I the disk-chamber itself, as well as its component parts, is held in place without the use of screws. The top B has downwardly-extending posts P, which bear directly upon the top of the disk-chamber, as seen in Fig. 1, the top and bottom of the disk-chamber, as well as the disk-chamber itself, being held rigidly in place without the necessity of screws or other attaching means. The cover itself is held in place upon the base n the usual manner—as, for example, by nuts and bolts passing through lugs Q on the base and lugs R on the top, as seen in Figs. 2 and 3. The wall E is spaced apart from the case and is open at the top and one side, as shown in Fig. 2, and the wall F has a port F' therein, as shown in Fig. 1 and in dotted lines in Fig. 2. The disk-chamber has an inlet-port S and an outlet-port T, the latter being coincident with the outlet-port F' in the base.

Other than as herein described the disk-chamber may be of the usual construction, having the ball-disk U mounted therein and a diaphragm V vertically positioned between the inlet and outlet ports. The diaphragm has substantially the form shown in Fig. 7, the top and bottom edges W being slightly curved and adapted to fit into corresponding recesses W' in the inner faces of the top and bottom of the disk-chamber. The body part has two or more projections X, both at the top and bottom, to enter recesses in the top and bottom heads to position these parts relative to the body, so that the recesses for the diaphragm will always register truly, and to facilitate the assembling of the parts. Above the cover of the disk-chamber is a gear-stand X', upon which the registering mechanism is mounted. This stand has substantially the form shown in Fig. 6, having a tongue Y adapted to fit under lugs Z on the cover, portions of the tongue being removed at predetermined distances apart, as seen at Y', to allow the insertion of the tongue under the lugs. A slight turning of the stand brings the tongue under said lugs and locks it in place. The top B has a cylindrical bearing 1, in which is inserted a non-metallic self-lubricating bushing 2, such as leatheroid, through which extends a shaft 3, operable by the stem 4 on the disk in the usual way. The upper end is provided with pinion 5, having gear connection with the registering mechanism, which may be of the usual construction. A packing 6, composed of a series of films of cork, is placed below the non-metallic bushing 2 and is compressible by means of a nut 7 on the bearing 1. The packing is placed at the bottom to thoroughly protect the bushing from the water, thus protecting the lubricating qualities of the bushing.

In Figs. 8, 9, and 10 is illustrated the means of applying my improvements to a meter for use in connection with vertical pipes. The base A is provided with a lateral projection A', having an inlet-port 8 and outlet-port 9, the outlet-port being the higher. The base is provided with the raised ring I and the centering-walls E and F, as before. The outlet-port 9 terminates in the centering-face F and the inlet-port to one side thereof. The disk-chamber is of the same construction as before described, its outlet-port registering with the outlet-port 9 in the casing. Unions 10 and 11 are adapted to connect with the service-pipe. Constructed in this way the device is very simple, can be drained perfectly, and the disk-chamber can be of the same construction as when used in connection with horizontal pipes.

The operation of my improved device is as follows: Water enters through the inlet-port into the casing, thence passes into the disk-chamber through the inlet-port therein and discharges through the outlet-ports in the disk-chamber and base to the service-pipe.

The advantages of my improved water-meter are that its parts are readily and quickly assembled, the disk-chamber is removably held in place without the aid of attaching-screws, either in the assembling of the parts of the disk-chamber itself or in its relation to the disk-chamber case, it admits of perfect drainage of the parts when desired, thus avoiding all liability of water remaining in the meter and injuring it by freezing, the gearing is entirely separated from the water-chambers of the meter, and the self-lubricating bushing is effectually protected from the injurious effects of contact with water.

Having thus described my invention and its use, I claim—

1. In a disk water-meter, the combination with an outer casing comprising a top and base, the base having inwardly-projecting centering-faces extending upwardly from the bottom, one of said centering-faces having an outlet-port therein, of a disk-chamber having corresponding laterally-projecting centering-faces extending upwardly from the bottom, one of said faces on the disk-chamber being provided with an outlet-port near the bottom to register with said port in the casing thus forming a continuous waterway directly from the interior of the disk-chamber to the distributing-pipe.

2. In a disk water-meter, the combination with an outer casing comprising a top and base, the base having vertically-positioned centering-faces therein spaced apart from the interior wall thereof and a supporting-ring extending upwardly from the bottom thereof and spaced apart from said wall, of a disk-chamber having corresponding centering-faces on the outside and a circular rim on the bottom thereof adapted to rest down on said ring and means for holding the disk-chamber against vertical movement.

3. In a disk water-meter, the combination with an outer casing comprising a top and base, the base being provided with outlet and inlet ports and centering-faces, of a disk-chamber mounted in said base and provided with corresponding centering-faces, the top of the casing being provided with projecting posts adapted to rest on the top of the disk-chamber, whereby the disk-chamber is held against lateral or vertical movement in the disk-casing.

In testimony whereof I have signed my name to this specification, in presence of two subscribing witnesses, this 18th day of December, 1905.

JOHN P. KELLY.

In presence of—
 E. BERT JOHNSON,
 JOHN W. MOWBERY.